(12) United States Patent
Honda et al.

(10) Patent No.: US 11,181,185 B2
(45) Date of Patent: Nov. 23, 2021

(54) ECCENTRIC OSCILLATING SPEED REDUCER

(71) Applicant: DENSO CORPORATION, Kariya (JP)

(72) Inventors: Yukihiro Honda, Kariya (JP); Hiroshi Okada, Kariya (JP)

(73) Assignee: DENSO CORPORATION, Kariya (JP)

( * ) Notice: Subject to any disclaimer, the term of this patent is extended or adjusted under 35 U.S.C. 154(b) by 115 days.

(21) Appl. No.: 16/788,573

(22) Filed: Feb. 12, 2020

(65) Prior Publication Data

US 2020/0271215 A1 Aug. 27, 2020

(30) Foreign Application Priority Data

Feb. 22, 2019 (JP) .............................. JP2019-030380

(51) Int. Cl.
| | |
|---|---|
| *F16H 57/04* | (2010.01) |
| *F16H 1/32* | (2006.01) |
| *F16D 3/04* | (2006.01) |
| *F16H 57/08* | (2006.01) |

(52) U.S. Cl.
CPC ........... *F16H 57/0427* (2013.01); *F16D 3/04* (2013.01); *F16H 57/0482* (2013.01); *F16H 2057/085* (2013.01)

(58) Field of Classification Search
CPC ............ F16H 57/0427; F16H 57/0482; F16H 2057/085; F16H 1/32; F16H 2001/325; F16H 2001/326; F16H 2001/327
See application file for complete search history.

(56) References Cited

U.S. PATENT DOCUMENTS

| | | | | |
|---|---|---|---|---|
| 4,282,777 | A * | 8/1981 | Ryffel | ........................ F16H 1/32 |
| | | | | 418/61.3 |
| 8,932,170 | B2 * | 1/2015 | Ishizuka | .............. B60K 17/046 |
| | | | | 475/159 |
| 2009/0301416 | A1 | 12/2009 | Watanabe | |
| 2010/0319569 | A1 * | 12/2010 | Miki | ........................ B61C 9/46 |
| | | | | 105/108 |
| 2016/0146159 | A1 | 5/2016 | Kimoto et al. | |
| 2017/0335925 | A1 | 11/2017 | Honda et al. | |
| 2019/0292952 | A1 | 9/2019 | Miyachi et al. | |

FOREIGN PATENT DOCUMENTS

| | | |
|---|---|---|
| JP | H0756321 B2 * | 5/1995 |
| JP | 2017-115602 | 6/2017 |
| JP | 2018-155209 | 10/2018 |
| JP | 2019-44801 | 3/2019 |

* cited by examiner

*Primary Examiner* — Sherry L Estremsky
(74) *Attorney, Agent, or Firm* — Nixon & Vanderhye P.C.

(57) ABSTRACT

An eccentric oscillating speed reducer includes an input rotor, a first rotor, a second rotor, a planetary rotor, a flow passage, a contact portion and a radial relief groove. The flow passage includes an axial gap located between the planetary rotor and a contact member. The flow passage conducts a lubricant oil that is forced to flow by a centrifugal force. The contact portion is placed in a drive force transmission path from the planetary rotor to the second rotor. The contact portion includes: a planetary rotor end surface of the planetary rotor located on a side where the second rotor is placed; and a second rotor end surface of the second rotor, which is opposed to the planetary rotor end surface. The radial relief groove forms a portion of the flow passage and extends through a radial width of the planetary rotor end surface.

8 Claims, 7 Drawing Sheets

ECCENTRIC OSCILLATING SPEED REDUCER

CROSS REFERENCE TO RELATED APPLICATION

This application is based on and incorporates herein by reference Japanese Patent Application No. 2019-030380 filed on Feb. 22, 2019.

TECHNICAL FIELD

The present disclosure relates to an eccentric oscillating speed reducer.

BACKGROUND

Previously, there has been proposed an eccentric oscillating speed reducer that transmits a drive force between a first rotor and a second rotor and changes a relative rotational phase between the first rotor and the second rotor through a planetary motion of a planetary rotor received at an inside of the first rotor.

SUMMARY

This section provides a general summary of the disclosure, and is not a comprehensive disclosure of its full scope or all of its features.

According to the present disclosure, there is provided an eccentric oscillating speed reducer including a first rotor, a second rotor and a planetary rotor. The first rotor is configured to rotate about a rotational axis. The second rotor is received in the first rotor and is coaxial with the first rotor. The planetary rotor is configured to rotate about an eccentric axis while revolving around the rotational axis of the first rotor to change a relative rotational phase between the first rotor and the second rotor. The eccentric axis is eccentric to the rotational axis of the first rotor.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
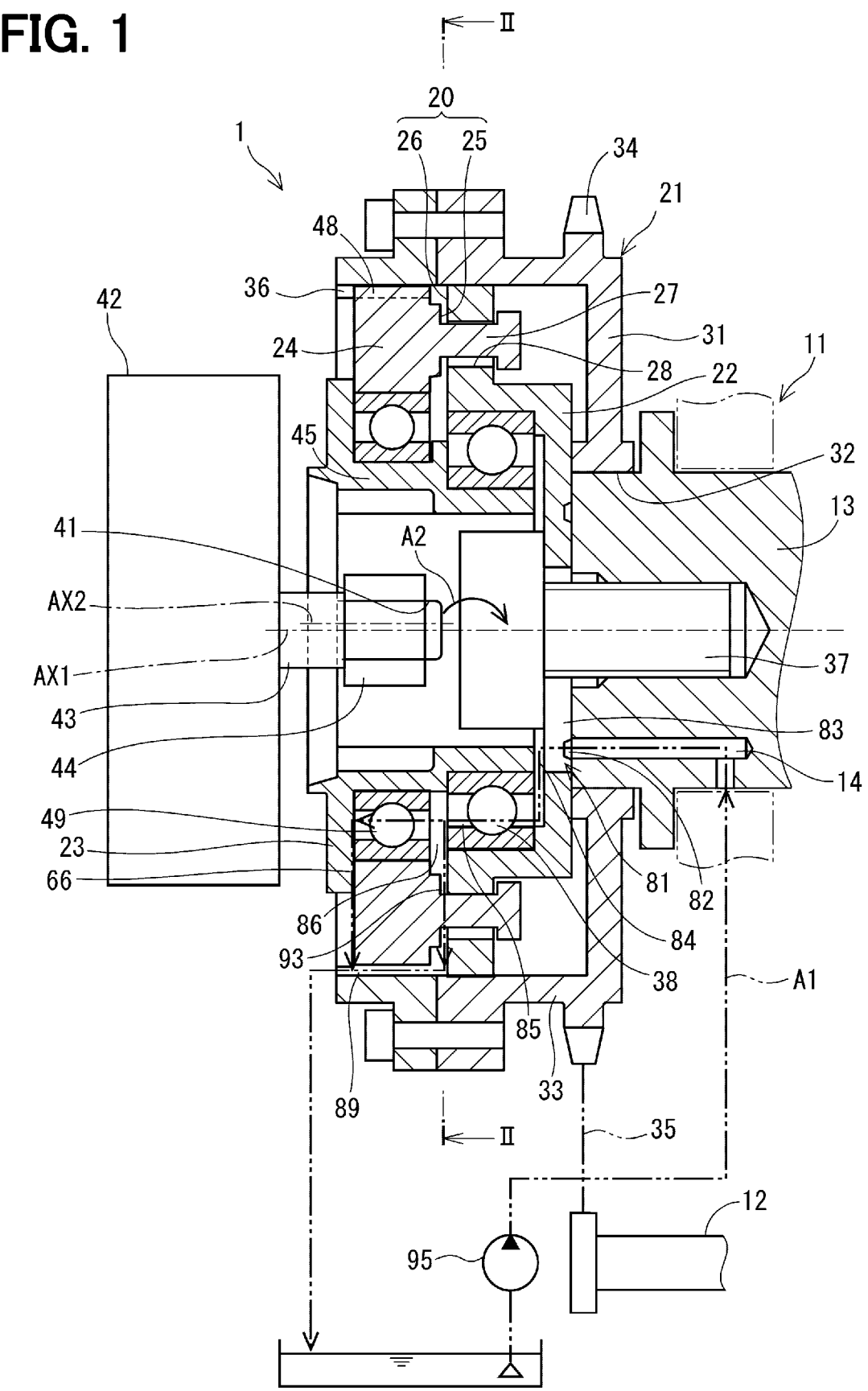
FIG. 1 is a cross-sectional view of a valve timing adjustment device, in which an eccentric oscillating speed reducer of a first embodiment is applied.

Previously, there has been proposed an eccentric oscillating speed reducer that transmits a drive force between a first rotor and a second rotor and changes a relative rotational phase between the first rotor and the second rotor through a planetary motion of a planetary rotor received at an inside of the first rotor. The planetary rotor includes an external gear portion that is meshed with an internal gear portion of the first rotor.

Normally, this type of eccentric oscillating speed reducer includes a lubricant oil mechanism that circulates a lubricant oil, which lubricates an inside of the eccentric oscillating speed reducer. The lubricant oil mechanism includes a lubricant oil flow passage and a pump while the pump is configured to feed the lubricant oil through the lubricant oil flow passage. The lubricant oil flow passage includes axial gaps, each of which is formed between corresponding adjacent two of the rotors. The lubricant oil flow passage extends from an inlet of a shaft inside flow passage to an outlet that is located on a radially outer side of the inlet. The lubricant oil is forced to flow by a centrifugal force in the flow passage toward the radially outer side and is outputted to the outside through the outlet. Thereby, the lubricant oil is circulated through the lubricant oil flow passage, and the lubricant oil flow passage is filled with the lubricant oil.

However, when the planetary rotor is tilted relative to a plane, which is perpendicular to an axial direction of the shaft, or when the planetary rotor is moved toward the second rotor placed adjacent to the planetary rotor, the axial gap between the planetary rotor and the second rotor is reduced or lost, and thereby the lubricant oil may not be supplied in the radial direction through the axial gap. As a result, there is a risk that a lubrication failure occurs at the sliding surfaces of the planetary rotator and of the second rotator or at a gear tooth meshing portion between the first rotator and the planetary rotator.

An eccentric oscillating speed reducer of the present disclosure includes an input rotor, a first rotor, a second rotor, a planetary rotor, a flow passage, a contact portion and at least one radial relief groove. The first rotor is supported to be coaxial with the input rotor. The first rotor includes an internal gear portion and is configured to rotate about a rotational axis. The second rotor is received in the first rotor and is coaxial with the first rotor.

The planetary rotor includes an external gear portion, which is meshed with the internal gear portion. The planetary rotor is configured to rotate about an eccentric axis while revolving around the rotational axis of the first rotor to change a relative rotational phase between the first rotor and the second rotor. The eccentric axis is eccentric to the rotational axis of the first rotor. The flow passage includes an axial gap located between the planetary rotor and a contact member while the contact member is configured to axially contact the planetary rotor. The flow passage is configured to conduct a lubricant oil that is forced to flow in the flow passage by a centrifugal force.

The contact portion is placed in a drive force transmission path, through which a drive force is transmitted from the planetary rotor to the second rotor. The contact portion includes: a contact end surface of the planetary rotor, which is located on a side where the contact member is placed; and an opposing end surface of the contact member, which is opposed to the contact end surface. The at least one radial relief groove is formed at the contact portion and forms a portion of the flow passage. At least one of the contact end surface and the opposing end surface has the at least one radial relief groove that extends through a radial width of the at least one of the contact end surface and the opposing end surface to communicate between a radially inner side and a radially outer side of the at least one of the contact end surface and the opposing end surface.

With the above configuration, even when the planetary rotor is tilted to cause a reduction or loss of the axial gap between the planetary rotor and the contact member, the lubricant oil is supplied to the radial relief groove, which is formed at the contact end surface or the opposing end surface, in a process of flowing the lubricant oil toward the radially outer side by the centrifugal force. Specifically, the lubricant oil can be smoothly conducted to the radially outer side through the radial relief groove. Therefore, it is possible to limit the lubrication failure at the sliding surfaces of the planetary rotor and of the second rotor and the gear tooth meshing portion between the first rotor and the planetary rotor.

According to the present disclosure, there is also provided an eccentric oscillating speed reducer that includes a first rotor, a second rotor, a planetary rotor, a flow passage, a flow passage forming portion and at least one radial relief groove. The first rotor is configured to rotate about a rotational axis. The second rotor is received in the first rotor and is coaxial with the first rotor. The planetary rotor is configured to rotate about an eccentric axis while revolving around the rotational axis of the first rotor to change a relative rotational phase between the first rotor and the second rotor. The eccentric axis is eccentric to the rotational axis of the first rotor. The flow passage includes an axial gap located between the planetary rotor and an opposing member while the opposing member axially opposes the planetary rotor. The flow passage is configured to conduct a lubricant oil that is forced to flow in the flow passage by a centrifugal force. The flow passage forming portion includes: an axial end surface of the planetary rotor, which is located on a side where the opposing member is placed; and an opposing end surface of the opposing member, which is opposed to the axial end surface. The at least one radial relief groove is formed at the flow passage forming portion and forms a portion of the flow passage. At least one of the axial end surface and the opposing end surface has the at least one radial relief groove that extends through a radial width of the at least one of the axial end surface and the opposing end surface to communicate between a radially inner side and a radially outer side of the at least one of the axial end surface) and the opposing end surface.

Hereinafter, embodiments of the present disclosure will be described with reference to the drawings. In the following embodiments, substantially identical components will be indicated by the same reference signs and will not be redundantly described for the sake of simplicity.

First Embodiment

An eccentric oscillating speed reducer of a first embodiment is applied to a valve timing adjustment device 1 shown in FIG. 1. The valve timing adjustment device 1 is installed in a drive force transmission path, through which a drive force is transmitted from a crankshaft 12 to a camshaft 13 at an internal combustion engine 11. The valve timing adjustment device 1 adjusts a valve timing of intake valves or exhaust vales that are opened and closed by the camshaft 13.

As shown in FIG. 1, the valve timing adjustment device 1 includes a first rotor 21, a second rotor 22, an input rotor 23 and a planetary rotor 24. The first rotor 21 includes a sprocket member shaped in a bottomed tubular form and a cover member shaped in a tubular form, and the sprocket member and the cover member are coaxially joined together. A shaft insertion hole 32 is formed through a bottom portion 31 of the first rotor 21, and the camshaft 13 is inserted into the shaft insertion hole 32. The first rotor 21 is rotated synchronously with the crankshaft 12 about a rotational axis AX1. The rotational axis AX1 is substantially coaxial with an axis of the camshaft 13. A sprocket 34 is integrally formed at an outer wall of the tubular portion 33 in one piece. The sprocket 34 is coupled to the crankshaft 12 through a transmission member 35, such as a chain. An internal gear portion 36, which has a plurality of internal gear teeth, is formed at an opening side of an inner wall of the tubular portion 33 in one piece.

The second rotor 22 is coaxial with the first rotor 21 and is rotated integrally with the camshaft 13. The second rotor 22 is shaped in a stepped circular disk plate form, and a center portion of the second rotor 22 is fixed to the camshaft 13 by a fastening member 37. In the present embodiment, the second rotor 22 serves as a contact member that contacts the planetary rotor 24 in the axial direction, and the second rotor 22 also serves as an opposing member that axially opposes the planetary rotor 24.

The input rotor 23 is shaped in a tubular form and is coaxial with the first rotor 21. A bearing (serving as a bearing member) 38 is installed to an outside of the input rotor 23 at a location that is between the input rotor 23 and the stepped portion of the second rotor 22. The bearing 38 supports the input rotor 23 such that the input rotor 23 is rotatable about the rotational axis AX1 relative to the second rotor 22. A fitting groove 41 is formed at an inner wall of the input rotor 23. A joint portion 44 of a rotatable shaft 43 of a rotary actuator 42 is fitted to the fitting groove 41 of the input rotor 23, so that the input rotor 23 is coupled to the rotary actuator 42.

Furthermore, the input rotor 23 has an eccentric portion 45 that is eccentric to the rotational axis AX1. A plurality of recesses (not shown), each of which opens toward a radially outer side, is formed at an eccentric side (radially outer side) of the eccentric portion 45. A resilient member (not shown) is received in each of the recesses. Hereinafter, an axis of the eccentric portion 45 will be referred to as an eccentric axis AX2.

The planetary rotor 24 includes a planetary external gear portion (or simply referred to as an external gear portion) 48 that has a plurality of external gear teeth. The external gear portion 48 is meshed with the internal gear portion 36, and the planetary rotor 24 is coaxial with the eccentric portion 45. A bearing 49 is placed between the eccentric portion 45 and the planetary rotor 24. When the input rotor 23 is rotated relative to the first rotor 21, the planetary rotor 24 revolves around the rotational axis AX1 and rotates about the eccentric axis AX2. More specifically, when the input rotor 23 rotates relative to the first rotor 21 in the advancing direction, a rotational torque is generated from the input rotor 23 in the advancing direction. At this time, the planetary rotor 24 performs planetary motion while changing a gear tooth meshing position between the planetary rotor 24 and the first rotor 21, so that the second rotor 22 is rotated relative to the first rotor 21 in the retarding direction, and thereby the valve timing of the intake valves or the exhaust valves is retarded.

When the input rotor 23 outputs the rotational torque in the retarding direction or when the rotary actuator 42 stops suddenly, the planetary rotor 24 performs the planetary motion while changing the gear tooth meshing position between the planetary rotor 24 and the first rotor 21. At this time, the second rotor 22 rotates relative to the first rotor 21 in the advancing direction, and the valve timing of the intake valves or the exhaust valves is advanced.

When the planetary rotor 24 performs the planetary motion in the above described manner, the relative rotational phase between the first rotor 21 and the second rotor 22 changes. In this way, the valve timing of the intake valves or the exhaust valves is adjusted.

In contrast, when the input rotor 23 does not rotate relative to the first rotor 21, the planetary rotor 24 rotates together with the first rotor 21 and the second rotor 22 while maintaining the gear tooth meshing position between the planetary rotor 24 and the first rotor 21. At this time, the relative rotational phase between the first rotor 21 and the second rotor 22 is maintained, and thereby the valve timing is maintained.

An axial contact portion 20 between the planetary rotor 24 and the second rotor 22 is placed in a drive force transmission path, through which the drive force is transmitted from the planetary rotor 24 to the second rotor 22. The contact portion 20 includes: a planetary rotor end surface 25 of the planetary rotor 24, which is located on a side where the second rotor 22 is placed; and a second rotor end surface 26 of the second rotor 22, which is opposed to the planetary rotor end surface 25. In the present embodiment, the planetary rotor end surface 25 is formed as an annular surface that is raised in the axial direction. The planetary rotor end surface 25 serves as a contact end surface (also referred to as an axial end surface), and the second rotor end surface 26 serves as an opposing end surface. The planetary rotor 24 includes a plurality of pins 27 that project from the planetary rotor end surface 25 toward the second rotor 22. The pins 27 are inserted into a plurality of engaging holes 28 that are formed at the second rotor 22, and the pins 27 couple between the second rotor 22 and the planetary rotor 24 through the engaging holes 28. The pins 27 serve as engaging portions.

Figure 2:
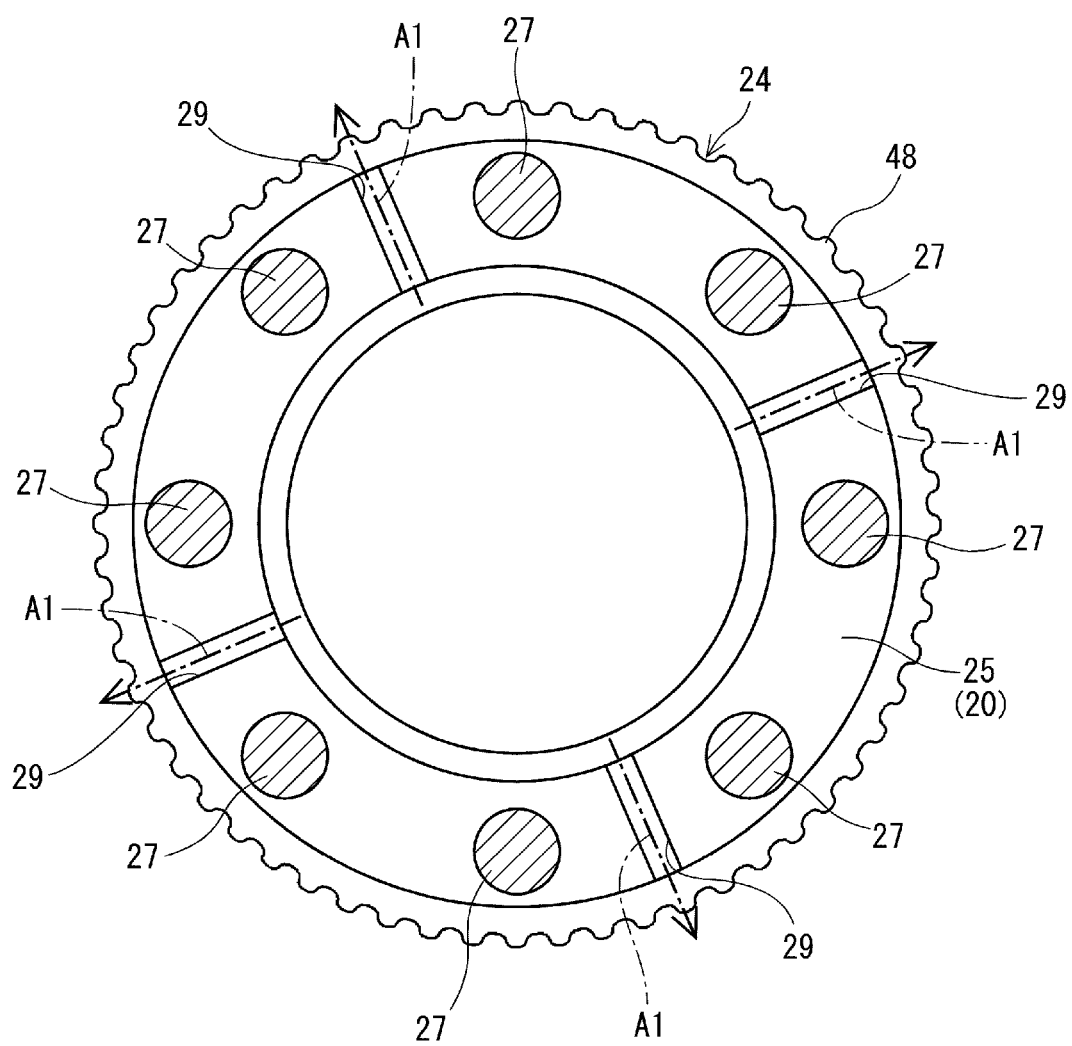
FIG. 2 is a cross-sectional view taken along line II-II in FIG. 1, showing a planetary rotor.

Furthermore, as shown in FIG. 2, a plurality of radial relief grooves (in the present embodiment, four radial relief grooves) 29 is formed at the planetary rotor end surface 25. Each of the radial relief grooves 29 extends through a radial width (radial extent) of the planetary rotor end surface 25 to communicate between a radially inner side and a radially outer side of the planetary rotor end surface 25 at the contact portion 20. The radial relief grooves 29 are radiated and are arranged one after another at equal intervals in the circumferential direction. Here, the contact portion 20 may be also referred to as a flow passage forming portion that forms the radial relief grooves 29 as a portion of a flow passage 81 described below.

Now, FIG. 1 is referred once again. The valve timing adjustment device 1 further includes the flow passage 81 that conducts a lubricant oil, which is circulated in the valve timing adjustment device 1. The flow passage 81 includes: an annular groove 82 and a through-hole 83 of the second rotor 22; an axial gap 84 between the second rotor 22 and the input rotor 23; an inside space 85 of the bearing 38, a radial gap 86 between the input rotor 23 and the planetary rotor 24; an axial gap 93 between the planetary rotor 24 and the second rotor 22; the radial relief grooves 29; and a tooth surface gap(s) 89 between a corresponding tooth surface of the internal gear portion 36 and a corresponding tooth surface of the external gear portion 48. An inlet of the flow passage 81 is an opening of the annular groove 82. An outlet of the flow passage 81 is an opening of the tubular portion 33 of the first rotor 21 and is located on a radially outer side of the inlet.

As indicated by a dot-dot-dash arrow A1 in FIG. 1, the lubricant oil is pumped by an oil pump 95 and is thereby supplied from a shaft inside flow passage 14 to the annular groove 82 of the second rotor 22 after passing through various parts of the internal combustion engine 11. The lubricant oil of the annular groove 82 is forced to flow toward the radially outer side by a centrifugal force through the through-hole 83, the axial gap 84, the inside space 85, the radial gap 86, the axial gap 93 and the radial relief grooves 29 and is discharged to the outside through the tooth surface gap(s) 89. The lubricant oil is circulated through a predetermined path, which includes the flow passage 81, in the above-described manner, and the flow passage 81 is filled with the lubricant oil.

Specifically, the lubricant oil is filled at: the contact portion 20, which is located at the sliding surfaces between the planetary rotor 24 and the second rotor 22; and the meshing portion between the planetary external gear portion 48 and the internal gear portion 36. Furthermore, the lubricant oil, which is supplied to the flow passage 81, passes through the other friction generating locations, such as the bearings 38, 49, while lubricating these locations.

(Advantages)

(1) At the operating time, when a force for tilting the planetary rotor 24 in a direction indicated by a solid arrow A2 in FIG. 1 is applied to the planetary rotor 24, the planetary rotor 24 may be tilted relative to a plane perpendicular to an axial direction of the camshaft 13 and/or may be moved toward the second rotor 22 to eliminate the axial gap 93. In the above-described embodiment, since each of the radial relief grooves 29 extends through the radial width of the planetary rotor end surface 25 to communicate between the radially inner side and the radially outer side of the planetary rotor end surface 25, the flow of the lubricant oil in the radial direction is maintained through the radial relief grooves 29 even if the axial gap 93 between the planetary rotor 24 and the second rotor 22 is reduced or lost. In this way, a good lubrication state is maintained without causing a lubrication failure at: the sliding surfaces between the planetary rotor 24 and the second rotor 22; and the meshing portion between the planetary external gear portion 48 and the first internal gear portion 36.

(2) In the above-described embodiment, the radial relief grooves 29 are located on a downstream side of the bearing 38 at the flow passage 81. Therefore, the lubricant oil can be smoothly flown through the bearing 38 that rotatably holds the input rotor 23 relative to the second rotor 22.

(3) In the above-described embodiment, the four radial relief grooves 29 are arranged one after another at equal intervals in the circumferential direction. By providing the plurality of radial relief grooves 29, the lubricant oil can be more reliably conducted to the radially outer side.

Second Embodiment

Figure 3:
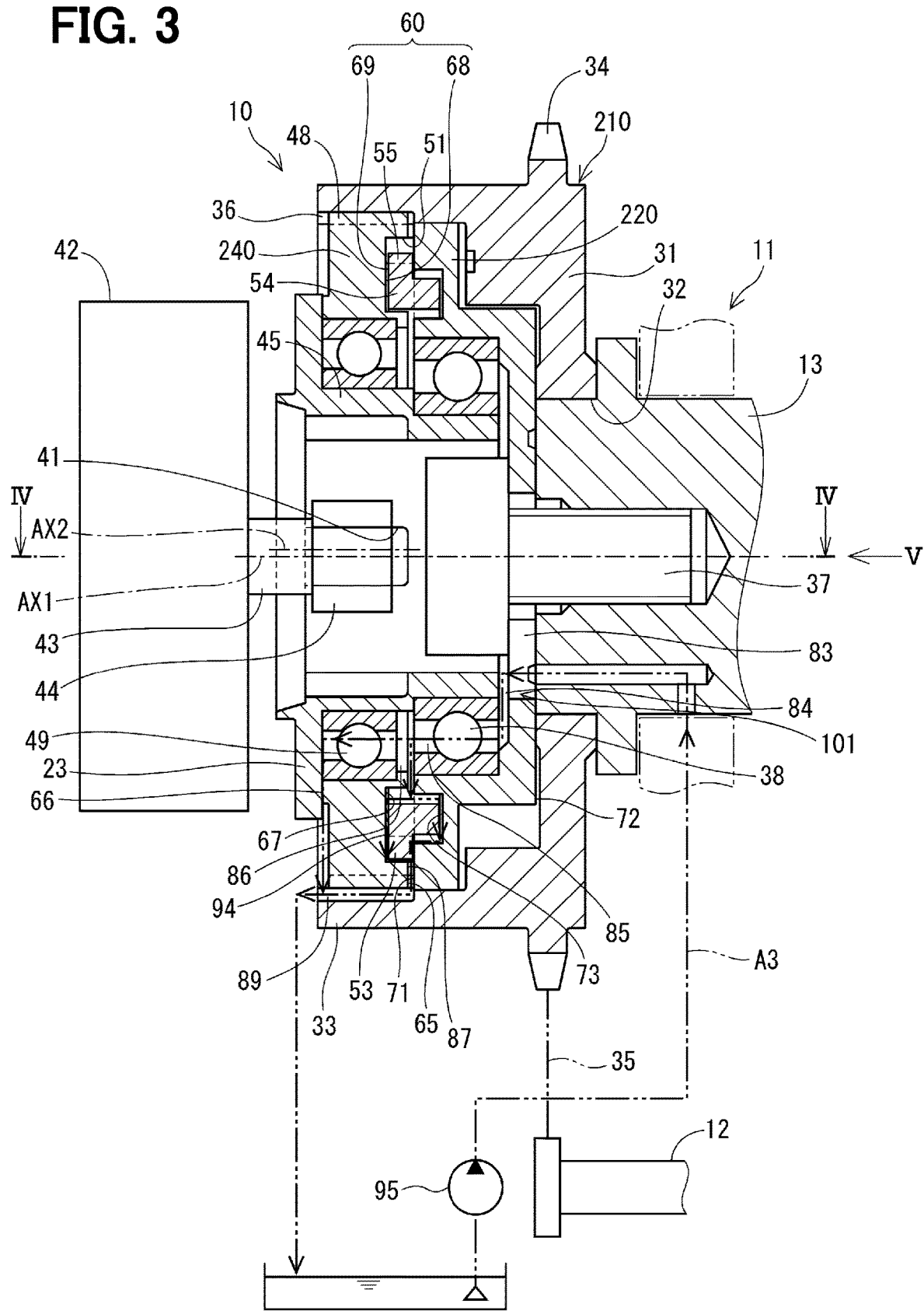
FIG. 3 is a cross-sectional view of a valve timing adjustment device, in which an eccentric oscillating speed reducer of a second embodiment is applied.

Next, a valve timing adjustment device 10 of a second embodiment of the present disclosure will be described with reference to FIGS. 3 to 5. As shown in FIG. 3, the valve timing adjustment device 10 of the second embodiment includes a first rotor 210, a second rotor 220, the input rotor 23, a planetary rotor 240 and an Oldham coupling 53. The Oldham coupling 53 serves as a contact member that contacts the planetary rotor 240 in the axial direction. The Oldham coupling 53 may be also referred to as a flow passage forming portion that forms the radial relief grooves 59 as a portion of a flow passage 101 described below.

A plurality (two in this embodiment) of primary engaging grooves 51 is formed integrally with the planetary rotor 240 in one piece, and a plurality (two in this embodiment) of secondary engaging grooves 52 (see FIG. 4) is formed integrally with the second rotor 220 in one piece. The Oldham coupling 53 transmits the drive force between the planetary rotor 240 and the second rotor 220 such that the Oldham coupling 53 radially oscillates, i.e., swings relative to the primary engaging grooves 51 and the secondary engaging grooves 52 and absorbs the eccentricity between the planetary rotor 240 and the second rotor 220. That is, an Oldham mechanism is formed by including the primary engaging grooves 51, the secondary engaging grooves 52 and the Oldham coupling 53.

Figure 4:
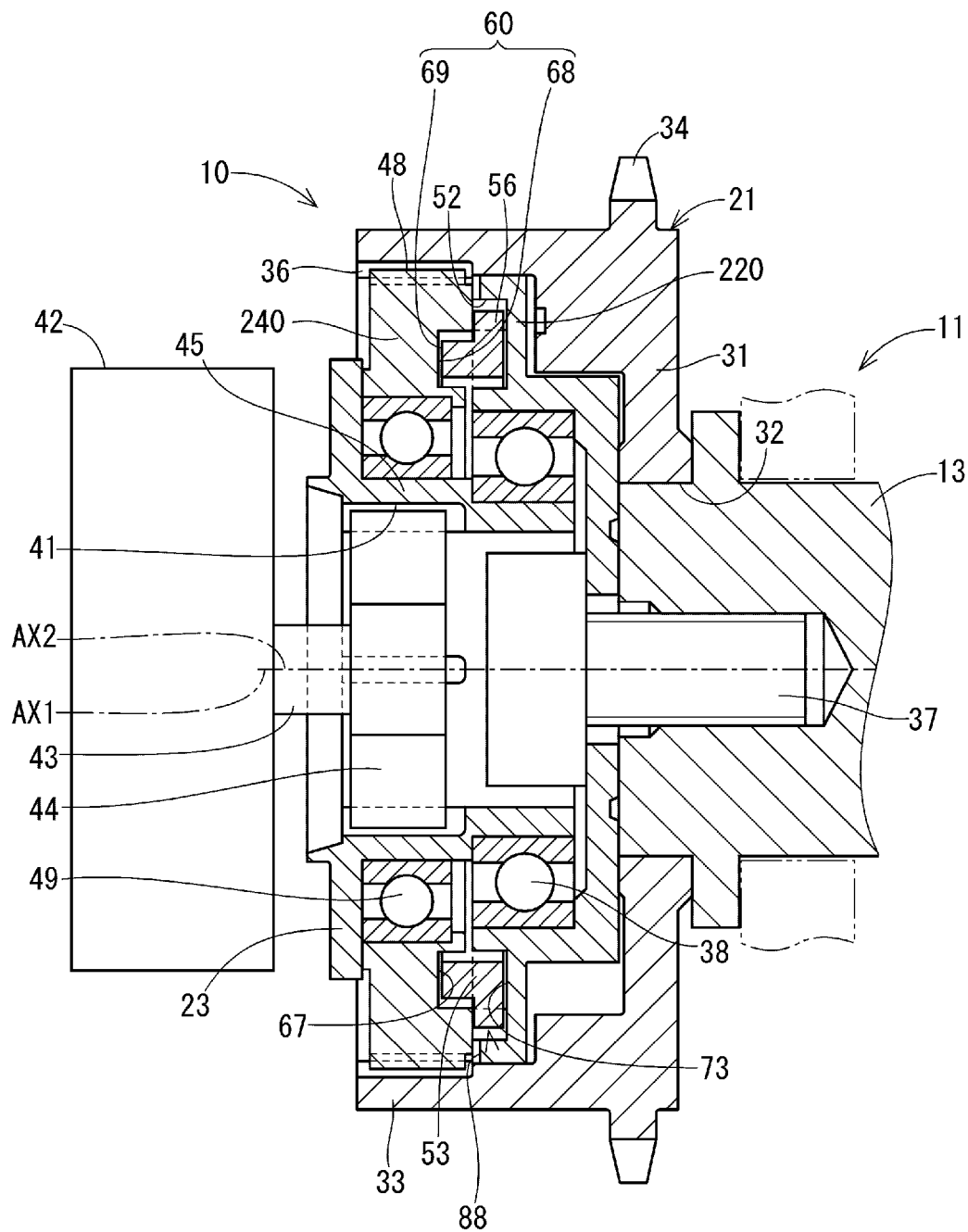
FIG. 4 is a cross-sectional view taken along line IV-IV in FIG. 3.

The Oldham coupling 53 includes a ring portion 54, a plurality (two in this embodiment) of primary engaging projections 55 and a plurality (two in this embodiment) of secondary engaging projections 56 (see FIG. 4). The primary engaging projections 55 and the secondary engaging projections 56 radially outwardly project from the ring portion 54. Hereinafter, one side of the ring portion 54 in a widthwise direction (axial direction) of the ring portion 54 will be referred to as one side part, and the other side of the ring portion 54, which is opposite to the one side in the widthwise direction, will be referred to as the other side part. The primary engaging projections 55 are respectively formed at two locations of the one side part of the ring portion 54 along a first sliding direction that is perpendicular to the axial direction. The secondary engaging projections 56 are respectively formed at two locations of the other side part of the ring portion 54 along a second sliding direction that crosses the axial direction and the first sliding direction.

As shown in FIG. 3, the primary engaging projections 55 are fitted into the primary engaging grooves 51, respectively. The primary engaging projections 55 are slidably fitted into the primary engaging grooves 51, respectively. The primary engaging projections 55 are configured to circumferentially engage with the primary engaging grooves 51 to transmit the drive force between the planetary rotor 240 and the Oldham coupling 53. As shown in FIG. 4, the secondary engaging projections 56 are fitted into the secondary engaging grooves 52, respectively. The secondary engaging projections 56 are slidably fitted into the secondary engaging grooves 52, respectively. The secondary engaging projections 56 are configured to circumferentially engage with the secondary engaging grooves 52 to transmit the drive force between the Oldham coupling 53 and the second rotor 220.

The planetary rotor 240 has a first receiving recess 67, which is shaped in a ring form and is recessed from one end surface 65 of the planetary rotor 240, which is located on the Oldham coupling 53 side, toward the other end surface 66 of the planetary rotor 240, which is opposite to the one end surface 65, and the first receiving recess 67 receives the one side part of the ring portion 54 of the Oldham coupling 53. The primary engaging grooves 51 radially outwardly extend from the first receiving recess 67. Each of the primary engaging grooves 51 does not penetrate to the tooth surfaces of the external gear portion 48.

The second rotor 220 has a second receiving recess 73, which is shaped in a ring form and is recessed from one end surface 71 of the second rotor 220, which is located on the Oldham coupling 53 side, toward the other end surface 72 of the second rotor 220, which is opposite to the one end surface 71, and the second receiving recess 73 receives the other side part of the ring portion 54 of the Oldham coupling 53. The secondary engaging grooves 52 radially outwardly extend from the second receiving recess 73. Each of the secondary engaging grooves 52 does not penetrate to the outer peripheral surface of the second rotor 220.

An axial contact portion 60 between the planetary rotor 240 and the Oldham coupling 53 is placed in a drive force transmission path, through which the drive force is transmitted from the planetary rotor 240 to the second rotor 220. The contact portion 60 includes: a planetary rotor end surface 68 of the planetary rotor 240, which is located on a side where the second rotor 220 is placed; and an Oldham coupling end surface 69 of the Oldham coupling 53, which is opposed to the planetary rotor end surface 68. In the present embodiment, the planetary rotor end surface 68 is a bottom surface of the first receiving recess 67 and is shaped in an annular form. The planetary rotor end surface 68 serves as a contact end surface, and the Oldham coupling end surface 69 serves as an opposing end surface. An axial gap 94 is formed between the planetary rotor end surface 68 and the Oldham coupling end surface 69.

Figure 5:
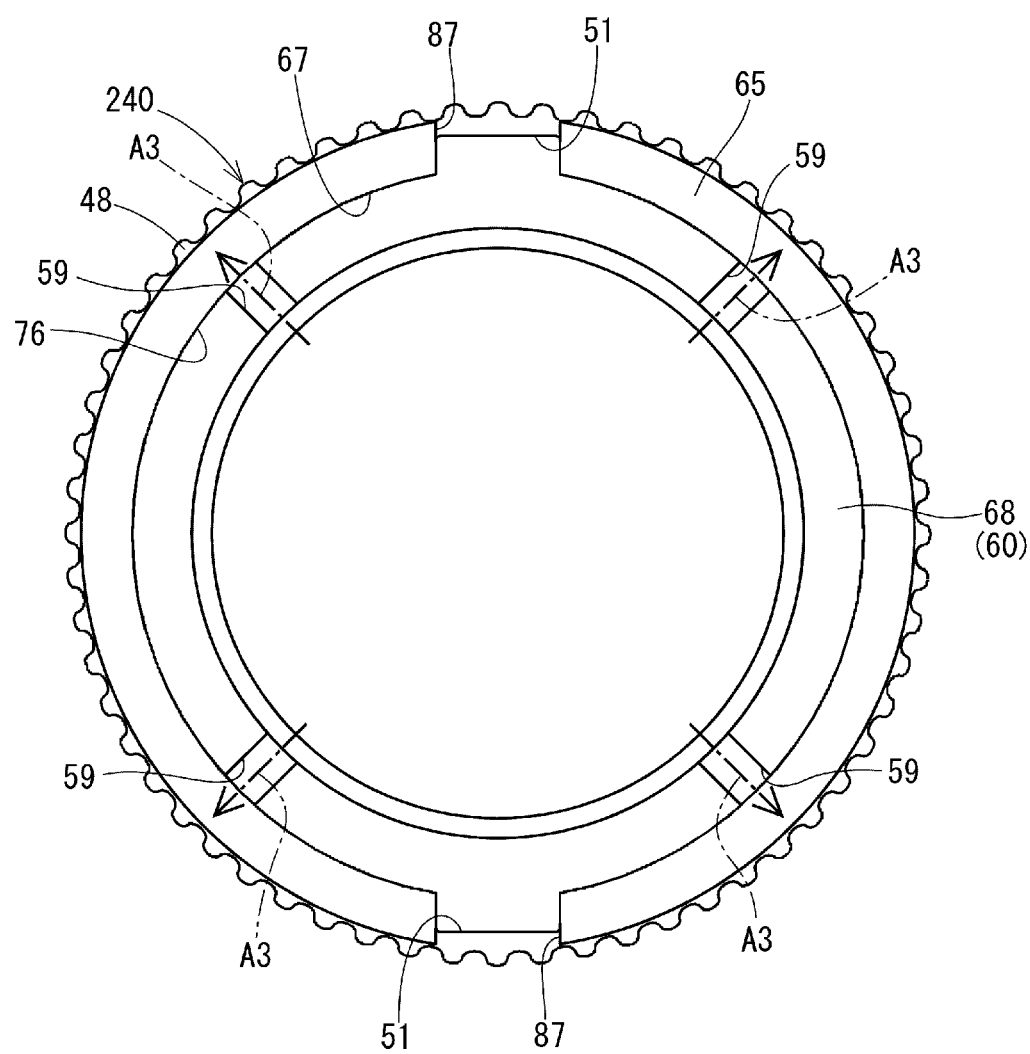
FIG. 5 is a front view of a planetary rotor seen in a direction of an arrow V in FIG. 3.

Furthermore, as shown in FIG. 5, a plurality of radial relief grooves (in the present embodiment, four radial relief grooves) 59 is formed at the planetary rotor end surface 68. Each of the radial relief grooves 59 extends through a radial width (radial extent) of the planetary rotor end surface 68 to communicate between a radially inner side and a radially outer side of the planetary rotor end surface 68 at the contact portion 60. The radial relief grooves 59 are arranged one after another at equal intervals in the circumferential direction.

Now, FIG. 3 is referred once again. The flow passage 101 includes: the annular groove 82 and the through-hole 83 of the second rotor 220; the axial gap 84 between the second rotor 220 and the input rotor 23; the inside space 85 of the bearing 38; the radial gap 86 between the input rotor 23 and the planetary rotor 240; the second receiving recess 73; and the first receiving recess 67.

Furthermore, the flow passage 101 includes: the primary engaging grooves 51 and a plurality (two in this embodiment) of primary flow passage grooves 87 of the planetary rotor 240; the secondary engaging grooves 52 (see FIG. 4) and a plurality (two in this embodiment) of secondary flow passage grooves 88 (see FIG. 4) of the second rotor 220; and the tooth surface gap(s) 89 between the corresponding tooth surface of the internal gear portion 36 and the corresponding tooth surface of the external gear portion 48. As shown in FIG. 5, each of the primary flow passage grooves 87 radially penetrates from the corresponding primary engaging groove 51 to the radially outer side of the planetary rotor 240, i.e., radially communicates the corresponding primary engaging groove 51 to the radially outer side of the planetary rotor 240. Similarly, each of the secondary flow passage grooves 88 (see FIG. 4) radially penetrates from the corresponding secondary engaging groove 52 to the radially outer side of the second rotor 220, i.e., radially communicates the corresponding secondary engaging groove 52 to the radially outer side of the second rotor 220.

Therefore, similar to the first embodiment, even in the case where the axial gap 94 between the planetary rotor 240 and the Oldham coupling 53 is lost, the lubricant oil is filled in the flow passage 101 through the radial relief grooves 59. In this way, a good lubrication state is maintained without causing a lubrication failure at: the sliding surfaces of the Oldham coupling 53 and of the planetary rotor 240; the sliding surfaces of the Oldham coupling 53 and of the second rotor 220; the sliding surfaces of the second rotor 220 and of the planetary rotor 240; the meshing portion between the planetary external gear portion 48 and the first internal gear portion 36; and the bearing 38.

Other Embodiments

In each of the above embodiments, the radial relief grooves 29, 59 are formed at the planetary rotor end surface 25, 68. Alternatively, the radial relief grooves may be formed at the second rotor end surface 26 of the second rotor 22 of the first embodiment or the Oldham coupling end surface 69 of the Oldham coupling 53 of the second embodiment, which respectively serve as the opposing end surface of the the contact member.

In each of the above embodiments, the radial relief grooves 29, 59 are formed on the downstream side of the bearing 38. Alternatively, the radial relief grooves may be formed at another location that is other than the downstream side of the bearing 38. The location of the bearing may vary depending on the location of the respective rotors, and the radial relief grooves may be formed at the contact end surface or the opposing end surface such that the radial relief grooves communicate between the radially inner side and the radially outer side of the contact end surface or the opposing end surface.

Figure 6:
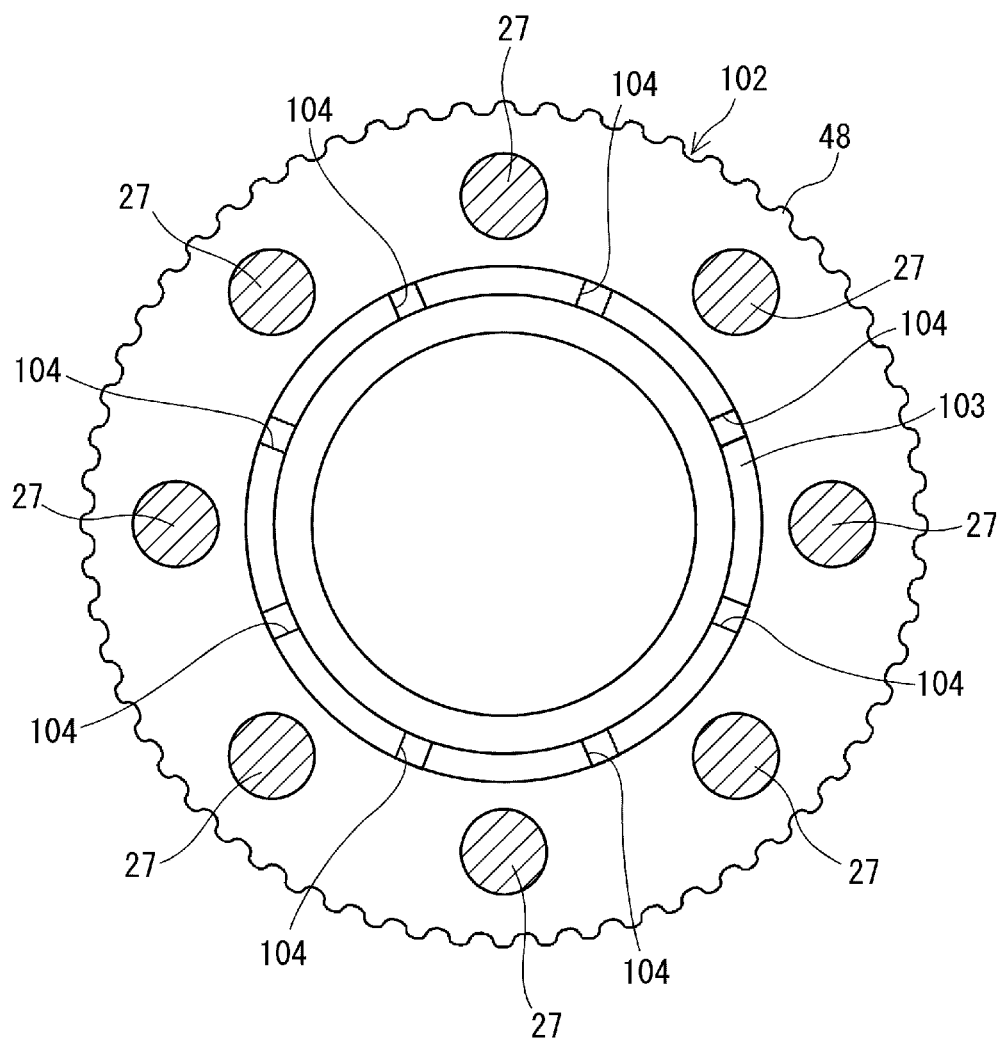
FIG. 6 is a diagram showing a planetary rotor according to another embodiment.

In the first embodiment, the planetary rotor end surface 25, at which the radial relief grooves 29 are formed, is formed as the annular surface that is formed by raising a radial intermediate part of the radial width of the planetary rotor 24 in the axial direction. Alternatively, like in a case of a planetary rotor 102 shown in FIG. 6, in order to minimize a contact resistance, a planetary rotor end surface 103 may be shaped in a form of an annular surface, which has a narrow width and is formed by axially raising a portion of the planetary rotor 102 that is located on a radially inner side of the pins 27. Radial relief grooves 104 may be formed at the planetary rotor end surface 103 in a manner similar to that of the radial relief grooves 29 of the first embodiment.

Figure 7:
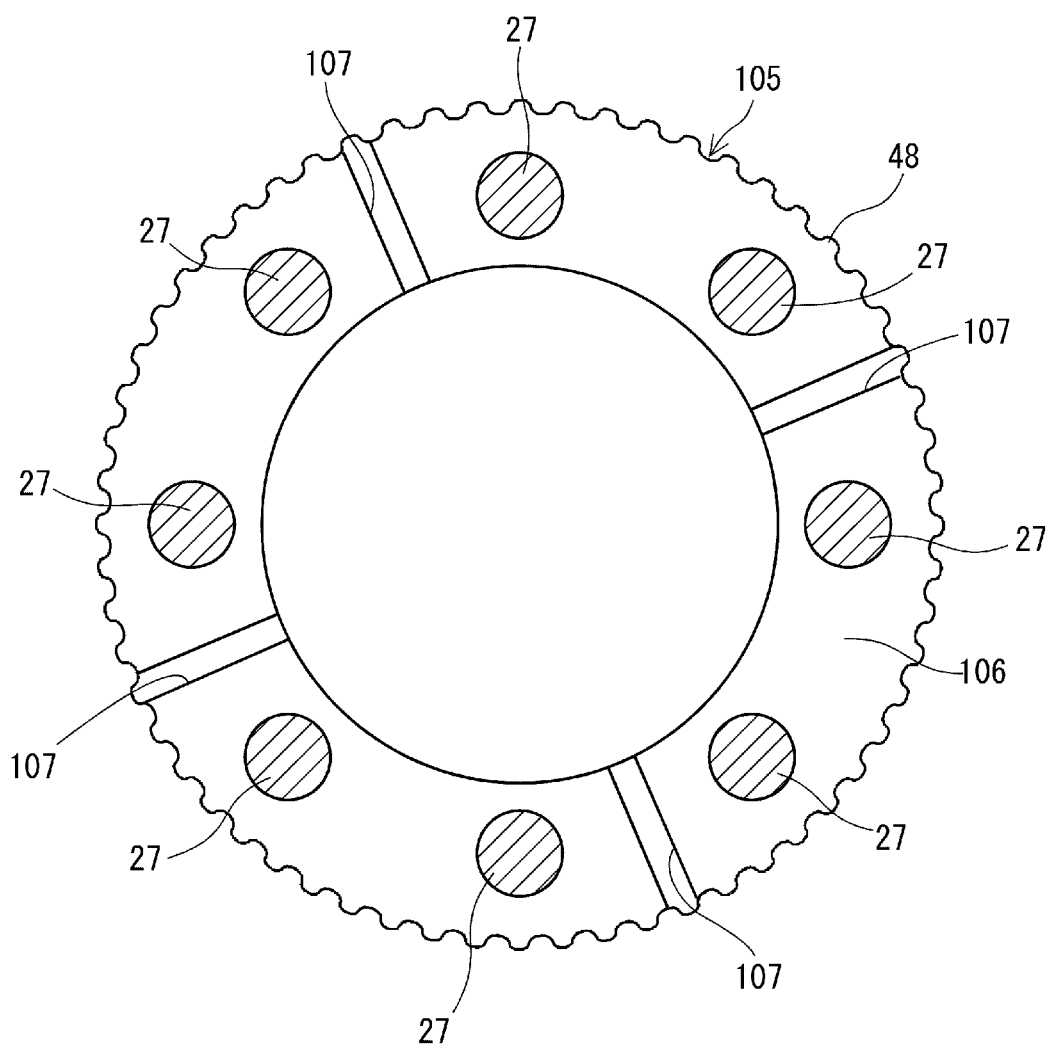
FIG. 7 is a diagram showing a planetary rotor according to another embodiment.

Furthermore, like in a case of a planetary rotor 105 shown in FIG. 7, the planetary rotor 105 may not have the axially raised surface and may be configured to contact the second rotor 22 throughout an entire planetary rotor end surface 106 except portions where the pins 27 are formed. Even in this case, radial relief grooves 107 may be formed at the planetary rotor end surface 106 in a manner similar to that of the radial relief grooves 29 of the first embodiment. As discussed above, the radial relief grooves may be formed at the contact end surface or the opposing end surface such that the radial relief grooves communicate between the radially inner side and the radially outer side of the contact end surface or the opposing end surface.

In each of the above embodiments, the four radial relief grooves 29, 59 are arranged one after another at equal intervals in the circumferential direction. Alternatively, the radial relief grooves may not be arranged at the equal intervals and may not be radiated. Also, the number of the radial relief groove(s) may be one, two, three or any other number that is more than four like the radial relief grooves 104 shown in FIG. 6.

In the above embodiments, the planetary rotor 24, 240 is configured to contact the second rotor 22 or the Oldham coupling 53 (serving as the contact member) in the axial direction. Alternatively, the planetary rotor 24, 240 may not contact the second rotor 22 or the Oldham coupling 53 in the axial direction along the drive force transmission path even when the planetary rotor 24, 240 or the other component is tilted relative to the plane that is perpendicular to the axial direction of the camshaft 13.

Specifically, as long as the size of the axial gap defined between the planetary rotor 24 and the second rotor 22 of the first embodiment shown in FIGS. 1 and 2 or the size of the axial gap defined between the planetary rotor 240 and the Oldham coupling 53 of the second embodiment shown in FIGS. 3 to 5 is small and does not allow the sufficient flow of the lubricant oil through the axial gap in the radial direction, at least one radial relief groove (i.e., one or a plurality of radial relief grooves) 29, 59 may be formed to increase the flow rate of the lubricant oil.

In such a case, at least one of the end surface (the axial end surface) 25, 68 of the planetary rotor 24, 240 and the end surface (the opposing end surface) 26, 69 of the second rotor (serving as the opposing member) 22 or of the Oldham coupling (serving as the opposing member) 53 may have the at least one radial relief groove 29, 59 that extends through the radial width of the at least one of the end surface 25, 68 and the end surface 26, 69 to communicate between the radially inner side and the radially outer side of the at least one of the end surface 25, 68 of the planetary rotor 24 and the opposing end surface 26, 69.

Furthermore, in this case, the end surface (the axial end surface) 25 of the planetary rotor 24 and the end surface (the opposing end surface) 26 of the second rotor 22 of the first embodiment may cooperate together to form the flow passage forming portion that forms the at least one radial relief groove 29, or the end surface (the axial end surface) 68 of the planetary rotor 240 and the end surface (the opposing end surface) 69 of the Oldham coupling 53 of the second embodiment may cooperate together to form the flow passage forming portion that forms the at least one radial relief groove 59. Furthermore, the axial end surface (i.e., the end surfaces 25, 68) of the planetary rotor 24, 240 discussed above is defined as an axial end surface of the opposing portion of the planetary rotor 24, 240, which is opposed to the end surface 26 of the second rotor 22 or the end surface 69 of the Oldham coupling 53. Also, the planetary rotor 24, 240 and the input rotor 23 of the above embodiments may cooperate together to serve as a planetary rotor of the present disclosure.

The present disclosure should not be limited to the above embodiments and may be implemented in various other forms without departing from the scope of the present disclosure.

What is claimed is:

1. An eccentric oscillating speed reducer comprising:
    an input rotor;
    a first rotor that is supported to be coaxial with the input rotor, wherein the first rotor includes an internal gear portion and is configured to rotate about a rotational axis;
    a second rotor that is received in the first rotor and is coaxial with the first rotor;
    a planetary rotor that includes an external gear portion, which is meshed with the internal gear portion, wherein the planetary rotor is configured to rotate about an eccentric axis while revolving around the rotational axis of the first rotor to change a relative rotational phase between the first rotor and the second rotor, and wherein the eccentric axis is eccentric to the rotational axis of the first rotor;
    a flow passage that includes an axial gap located between the planetary rotor and a contact member while the contact member is configured to axially contact the planetary rotor, wherein the flow passage is configured to conduct a lubricant oil that is forced to flow in the flow passage by a centrifugal force;
    a contact portion that is placed in a drive force transmission path, through which a drive force is transmitted from the planetary rotor to the second rotor, wherein the contact portion includes:
        a contact end surface of the planetary rotor, which is located on a side where the contact member is placed; and an opposing end surface of the contact member, which is opposed to the contact end surface; and at least one radial relief groove that is formed at the contact portion and forms a portion of the flow passage, wherein:

at least one of the contact end surface and the opposing end surface has the at least one radial relief groove that extends through a radial width of the at least one of the contact end surface and the opposing end surface to communicate between a radially inner side and a radially outer side of the at least one of the contact end surface and the opposing end surface.

2. The eccentric oscillating speed reducer according to claim 1, comprising a bearing member that is installed at an outside of the input rotor and supports the input rotor such that the input rotor is rotatable about the rotational axis relative to the second rotor, wherein the at least one radial relief groove is formed on a downstream side of the bearing member at the flow passage.

3. The eccentric oscillating speed reducer according to claim 1, wherein the at least one radial relief groove is a plurality of radial relief grooves that are radiated and are arranged one after another in a circumferential direction.

4. The eccentric oscillating speed reducer according to claim 1, wherein:

the flow passage includes an inlet and an outlet while the outlet is placed on a radially outer side of the inlet; and the flow passage is configured to conduct the lubricant oil that is forced to flow from the inlet to the outlet along the flow passage by the centrifugal force.

5. The eccentric oscillating speed reducer according to claim 1, comprising:

at least one engaging hole that is formed at the second rotor; and at least one engaging portion that couples between the second rotor and the planetary rotor through the engaging hole, wherein the contact member is the second rotor.

6. The eccentric oscillating speed reducer according to claim 1, comprising an Oldham coupling that is configured to circumferentially engage with the planetary rotor and the second rotor to transmit a drive force between the planetary rotor and the second rotor, wherein:

the Oldham coupling is configured to radially oscillate relative to the planetary rotor and the second rotor; and the contact member include the Oldham coupling.

7. The eccentric oscillating speed reducer according to claim 6, comprising:

a primary engaging groove that is formed integrally with the planetary rotor in one piece;

a secondary engaging groove that is formed integrally with the second rotor in one piece;

a primary engaging projection that is formed at the Oldham coupling and is configured to circumferentially engage with the primary engaging groove; and a secondary engaging projection that is formed at the Oldham coupling and is configured to circumferentially engage with the secondary engaging groove, wherein:

the flow passage includes at least one of:

a primary flow passage groove that radially communicates the primary engaging groove to a radially outer side of the planetary rotor; and a secondary flow passage groove that radially communicates the secondary engaging groove to a radially outer side of the second rotor.

8. An eccentric oscillating speed reducer comprising:

a first rotor that is configured to rotate about a rotational axis;

a second rotor that is received in the first rotor and is coaxial with the first rotor;

a planetary rotor that is configured to rotate about an eccentric axis while revolving around the rotational axis of the first rotor to change a relative rotational phase between the first rotor and the second rotor, and wherein the eccentric axis is eccentric to the rotational axis of the first rotor;

a flow passage that includes an axial gap located between the planetary rotor and an opposing member while the opposing member axially opposes the planetary rotor, wherein the flow passage is configured to conduct a lubricant oil that is forced to flow in the flow passage by a centrifugal force;

a flow passage forming portion that includes:

an axial end surface of the planetary rotor, which is located on a side where the opposing member is placed; and an opposing end surface of the opposing member, which is opposed to the axial end surface; and at least one radial relief groove that is formed at the flow passage forming portion and forms a portion of the flow passage, wherein:

at least one of the axial end surface and the opposing end surface has the at least one radial relief groove that extends through a radial width of the at least one of the axial end surface and the opposing end surface to communicate between a radially inner side and a radially outer side of the at least one of the axial end surface and the opposing end surface.

* * * * *